Dec. 12, 1944.  N. L. HAIGHT  2,365,073
MEANS FOR INDICATING HORSEPOWER AND HORSEPOWER FACTORS
Filed March 6, 1942
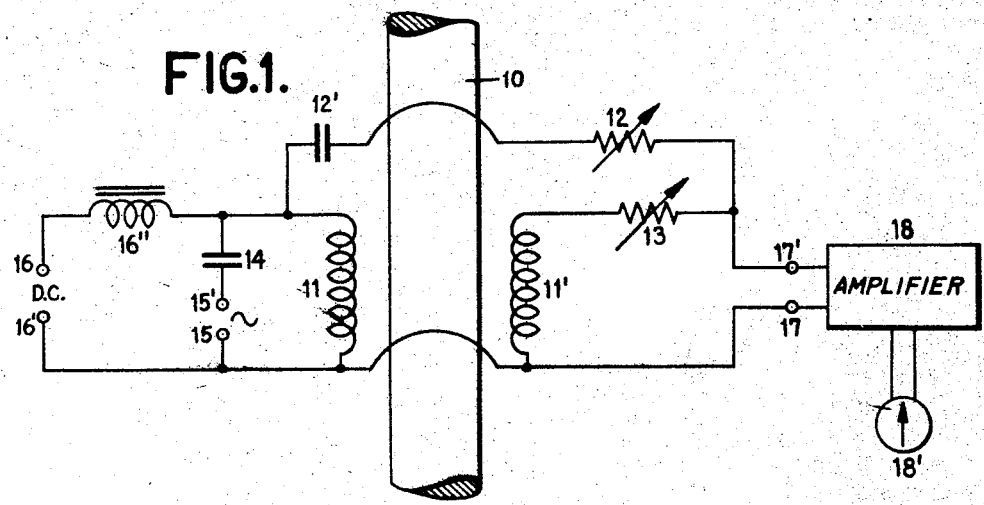
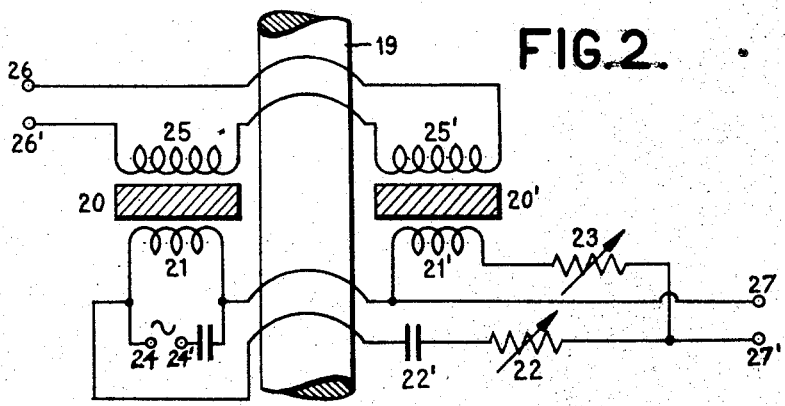
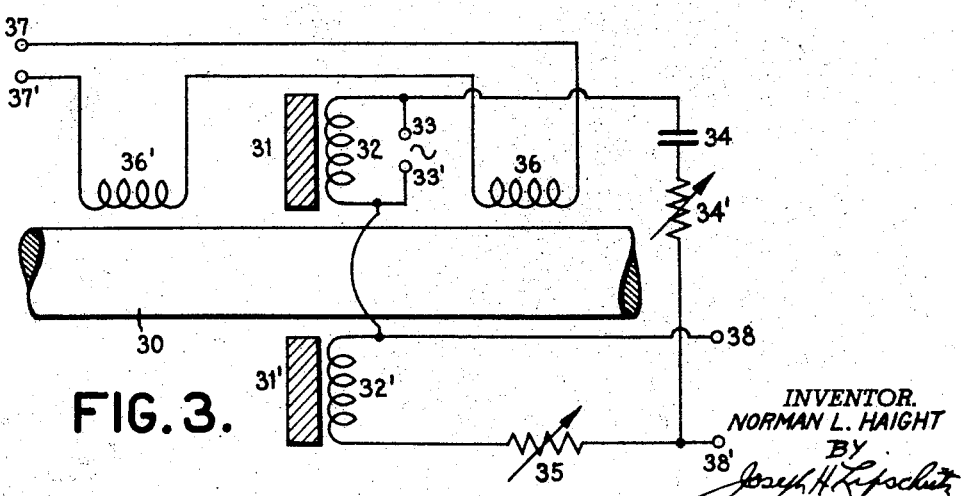
INVENTOR.
NORMAN L. HAIGHT
BY
Joseph H. Lipschitz
ATTORNEY.

Patented Dec. 12, 1944

2,365,073

UNITED STATES PATENT OFFICE 2,365,073

MEANS FOR INDICATING HORSEPOWER AND HORSEPOWER FACTORS

Norman L. Haight, Glen Ridge, N. J., assignor of one-half to H. D. Mallison, Philadelphia, Pa.

Application March 6, 1942, Serial No. 433,636

3 Claims. (Cl. 73—136)

This invention relates to a means for measuring and indicating the horsepower and horsepower factors of an element which is transmitting power. It is one of the principal objects of this invention to provide such a means whereby the horsepower factors, namely, torque and speed, may be measured and indicated either separately or as a function of the product of these factors, namely, horsepower. Thus the principle of this invention applies equally to the measurement of torque, speed and horsepower of a load transmitting element.

It is a further object of this invention to provide a means for indicating horsepower directly and instantaneously without the necessity which has heretofore existed of reading a plurality of meters and then performing mathematical calculations. By the use of this invention there is obtained a direct reading indicator of horsepower throughout the useful operating range of the element whose power transmission is being measured and which takes into full consideration all variables such as air consumption and fuel consumption of an engine as well as other operating conditions, and gives an immediate indication of the horsepower effect caused by the variation of any of these operating factors.

It is a further object of this invention to provide a horsepower measuring and indicating mechanism that requires no physical attachment to the torque transmitting element and does not require removal of the shaft for the purpose of installing torque or speed responsive elements.

It is a further object of this invention to provide a horsepower measuring and indicating means which will perform the functions set forth above and which may nevertheless be applied to a very restricted section of shaft on the order of several inches of axial length. This compares with horsepower measuring devices at present in use which require measuring elements which extend over several feet of shaft length.

The general principle underlying my invention consists in setting up magnetic flux within the torque transmitting shaft, causing the torque and speed of the shaft to vary the flux, and measuring the variations in flux. More specifically, I may cause the variations in magnetic flux to generate impulses whose magnitude varies with the torque and whose frequency varies with the rate of application of torque to the shaft by the power producing means.

Further objects and advantages of this invention will become apparent in the following detailed description thereof.

In the accompanying drawing,

Fig. 1 is a wiring diagram illustrating the theory and one application of this invention.

Figs. 2 and 3 are views similar to Fig. 1 illustrating modified forms of the invention.

Referring first to Fig. 1, there is shown diagrammatically a portion of a torque transmitting shaft 10 having a power producing element such as an electric motor, internal combustion engine, or similar mechanism at one end, and carrying a load at the other end. Heretofore it has been generally the practice to measure the transmitted horsepower by utilizing the fact that horsepower is a function of the speed and the torque. Speed can be measured in R. P. M., and torque can be measured by taking two points spaced axially along the length of the shaft 10 and measuring the angular displacement between these points because the load will cause a twist or torsional stress in the shaft which is a function of the load. Separate devices have heretofore been employed for obtaining the various factors necessary for determining horsepower, and these factors had to be utilized in calculations before the horsepower could be determined. Moreover, the measurements of the torsional stress usually required the application to the shaft of various devices, which meant that the shaft had to be disassembled in order that these devices might be applied thereto, and further it required the utilization of several feet of shaft length for the purpose of obtaining the necessary information.

Referring first to Fig. 1, there is shown one form of my invention, in which I have obviated all of the objections which resided in horsepower measuring and indicating devices heretofore employed. As illustrated in this figure, no attachments to the shaft are necessary and therefore it is not necessary to remove the shaft in order to apply mechanisms thereto. The device operates in cooperation with only a very small axial length of the shaft, and, finally, no calculations are necessary but, instead, a direct and instantaneous reading of horsepower is obtained upon an indicating instrument.

For accomplishing the above purposes, I have shown means in the form of an energizing coil 11 energized from a source of D. C. 16, 16' for producing flux, and positioned with its axis parallel to the axis of shaft 10 so that flux will be set up axially in shaft 10 due to the electric energization of the coil 11. Superimposed upon the flux from the D. C. source 16, 16' I provide an A. C. energization from source 15, 15' in parallel with the D. C. energization so that coil 11 also impresses upon shaft 10 an alternating flux of a frequency beyond the range of frequency of the power impulses applied to the shaft. Thus, if the shaft rotates 1200 R. P. M., this is 20 revolutions per second. The A. C. flux may be on the order of the standard 60 cycle alternating current.

Having set up flux in the rotating shaft 10, I now utilize two principles whereby I may obtain from the flux within the shaft a method for measuring speed or torque or the product of speed and torque, which is horsepower. The first of these principles is the magnetostrictive phenomenon which may be stated broadly as follows: When a magnetically permeable member is subjected to stress it changes its permeability, and this change in permeability is a function of stress and therefore is a function of torque. It will now be seen that since shaft 10 has flux impressed thereon and since its permeability varies with the stress, measuring the magnetic variations in the shaft 10 will at the same time be a measure of the torque.

For measuring the variations in the magnetic permeability of shaft 10, I may provide a responsive coil 11' positioned with its axis also parallel to the shaft 10 so as to be responsive to the variations in magnetic flux within said shaft. The coil 11' is connected in opposition to the coil 11 in a bridge arrangement which also includes a condenser 12' and resistances 12 and 13. The A. C. input of coil 11 will normally be picked up by the responsive coil 11' in an out-of-phase relationship, but the condenser 12' and adjustable resistances 12 and 13 cause the output to be of such phase relation to the input that normally no output will be obtained at the terminals 17, 17'. When, however, the magnetic flux within shaft 10 varies by reason of the stress caused by torque, an output will be obtained at terminals 17, 17' proportional to the changed flux condition within shaft 10.

The second factor which this invention takes into consideration is the following: If shaft 10 had a torque output which was constant, then the output of pick-up coil 11' would be of the same frequency as that of coil 11 but merely of different amplitude, dependent upon the stress in shaft 10. However, in every case in which a shaft is driven by an internal combustion engine, electric motor and the like, the stress in the shaft is not constant throughout a revolution but is cyclical in that the shaft is propelled by a series of impulses from the driving element. Thus there are, throughout the revolution of the shaft, points of maximum and minimum stress, the number of such cycles per revolution of the shaft depending upon the type of driving element, such as the number of cylinders in the internal combustion engine, the number of poles in the motor, etc. Since the stress within the shaft 10 varies from maximum to minimum cyclically a number of times per revolution of the shaft, it will be seen that the stress also varies from maximum to minimum, and thus the output of coil 11' will not be a constant amplitude wave of the same frequency as the input of coil 11 but will rather be a modulated wave caused by the superposition of the cyclical variations in stress of shaft 10 upon the wave impulses imparted by coil 11. The output which is picked up by coil 11' will therefore be a modulated wave of lower frequency than that of the wave impressed by coil 11 and of an amplitude which depends upon the degree of maximum stress existing in the shaft. It will be seen that the wave form of maximum and minimum stress caused by the pulsating rotation of shaft 10 will have a frequency depending upon the speed of rotation of the shaft. Thus, if there are 4 pulses to each revolution of shaft 10 and the shaft revolves 20 revolutions per minute, there will be a total of 80 pulses per minute, which wave form is superimposed upon the wave form induced by coil 11. The output picked up by coil 11' will therefore have a wave form whose amplitude is determined by the stress within shaft 10 but whose frequency is determined by the speed of rotation of said shaft.

It will now be seen that the various horsepower factors may be taken off from output terminals 17, 17', either separately to give an indication of torque, or an indication of speed, or they may be taken off as a composite to give a direct indication of horsepower. To indicate torque it is only necessary to have the input from terminals 17, 17' enter an amplifier which may be any known type of integrating amplifier, that is, it is responsive to amplitude alone but not to frequency. The indication obtained upon an indicator such as meter 18' will therefore be a direct reading of the torque. On the other hand, by utilizing an amplifier 18 which is any known type of frequency responsive amplifier but not responsive to amplitude, the meter 18' will give a direct reading of speed of rotation of shaft 10. Finally, by utilizing as amplifier 18 any known type of linear amplifier which is responsive to both amplitude and frequency, the meter 18' will give a direct reading of horsepower.

It will be understood that the D. C. source of energy 16, 16' could be dispensed with and only the A. C. source 15, 15' employed. Also, for the purpose of measuring horsepower and speed, the A. C. source could be dispensed with. The A. C. source, however, is necessary for the measurement of torque alone. The combination of D. C. and A. C. gives the preferred form since it places the operation of the flux variations within shaft 10 on that portion of the curve formed by plotting H (magnetic intensity) against B (induction) where it is least affected by the changes in sign of the alternating current and gives the maximum intensity. Where A. C. is used in addition to D. C. a choke coil 16'' may be employed to prevent the A. C. from flowing back to the D. C. source.

In Fig. 2 there is shown a modified form of the invention, although all of the essentials are the same. Instead, however, of having the energizing flux longitudinal of the shaft as in the Fig. 1 form, I cause the energizing flux to traverse the shaft 10 in a direction transverse to the longitudinal axis. I may accomplish this by a pair of energizing coils 25, 25' connected to the D. C. source 26, 26' and having their axes transverse of the longitudinal axis of the shaft. In this instance, instead of the single coil 11 there are a pair of coils 25, 25'. Also, instead of superimposing the A. C. on the same coil as the D. C., as in Fig. 1, I provide a separate coil 21 connected to a source 24, 24' of A. C. and also having its axis transverse of the longitudinal axis of the shaft and parallel to the axes of coils 25 and 25'. The pick-up or flux responsive coil 21' corresponding to the coil 11' is positioned with its axis parallel to the axes of the other coils, and to facilitate the pick-up, magnetic cores 20, 20' may be interposed between coils 21 and 25 and 21' and 25'. In this case also, the normal output from coil 21' is opposed to the normal A. C. input of coil 21 by a similar bridge arrangement with means consisting of condenser 22' and variable resistances 22 and 23 for bringing the input and output voltages into the proper phase relation.

In the Fig. 3 form of the invention, the D. C. flux is established by coils 36, 36' connected to D. C. source 37, 37', and having their axes parallel to the longitudinal axis of the shaft 30. The A. C. energizing coil 32 is connected to A. C. source 33, 33' and has its axis positioned transverse to the longitudinal axis of the shaft. The magnetic flux set up by the A. C. input may be intensified by a magnetic core 31. The pick-up or responsive coil 32' has its axis positioned similar to the axis of coil 32 and may be similarly provided with a magnetic core 31'. The coils 32 and 32' are opposed by the same bridge arrangement as in Figs. 1 and 2, including condenser 34 and variable resistances 34' and 35. The output is taken off terminals 38 and 38'.

The operation of the Figs. 2 and 3 forms is similar to that of Fig. 1.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for indicating the horsepower transmitted by a shaft connected to a power producing means, comprising means for energizing the shaft with flux, means responsive to variations in said flux, a linear amplifier responsive to both amplitude and frequency for amplifying the responses of said responsive means, and means for indicating the output of said amplifier to give a direct reading of horsepower.

2. A device for indicating the horse power transmitted by a shaft connected to a power producing means which propels the shaft by a series of impulses resulting in cyclical stresses in the shaft, the number of such stresses being a function of the speed of the shaft and the amplitude of such stresses being a function of the torque of the shaft, comprising means for energizing the shaft with flux, said impulses causing variations in said flux, means whereby said variations generate electric impulses which vary in amplitude and frequency in accordance with variations in said flux, means responsive to the product of the amplitude variations and the frequency variations of said impulses, and means actuated by said responsive means for giving a direct reading of horsepower.

3. A device for indicating horsepower transmitted by a shaft connected to a power producing means which propels the shaft by a series of impulses resulting in cyclical stresses in the shaft, the number of said stresses being a function of the speed of the shaft and the amplitude of said stresses being a function of the torque of the shaft, comprising means for energizing the shaft with A. C. flux, said impulses modulating said A. C. flux, means whereby said modulations generate electric impulses which vary in amplitude and frequency in accordance with variations in said flux, means responsive to said impulses for multiplying the amplitude variations by the frequency variations, and means actuated by said responsive means to give a direct reading of horsepower.

N. L. HAIGHT.